(No Model.)
J. HERKIMER.
HORSE COLLAR.
No. 250,355.  Patented Dec. 6, 1881.
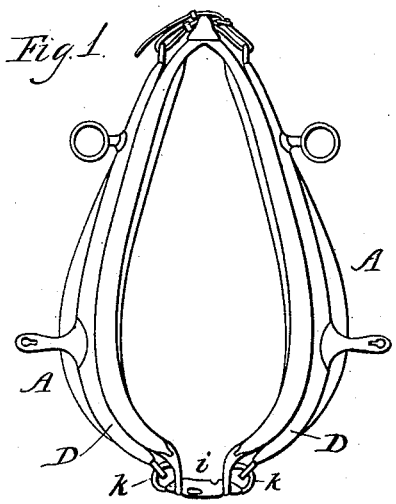
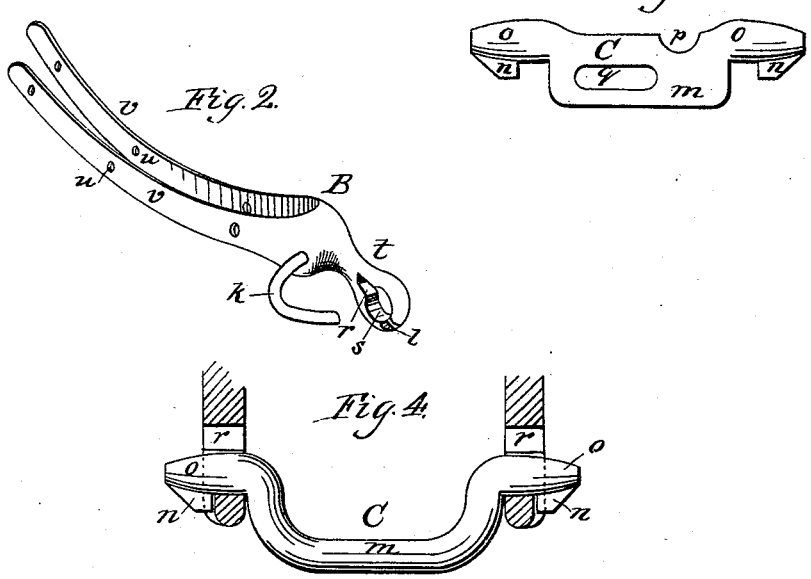
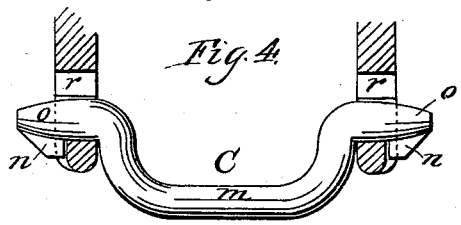
Witnesses—
F. B. Townsend
Chas. E. Gaylord.
Inventor—
Jacob Herkimer,
by P. C. Dyrenforth,
Atty.

UNITED STATES PATENT OFFICE.

JACOB HERKIMER, OF CHICAGO, ILLINOIS.

HORSE-COLLAR.

SPECIFICATION forming part of Letters Patent No. 250,355, dated December 6, 1881.

Application filed May 28, 1881. (No model.)

*To all whom it may concern:*

Be it known that I, JACOB HERKIMER, a citizen of the United States, residing at Chicago, in the county of Cook and State of Illinois, have invented certain new and useful Improvements in Horse-Collars; and I hereby declare the following to be a full, clear, and exact description thereof, reference being had to the accompanying drawings, of which—

Figure 1 is a front elevation of a horse-collar provided with my improvements; Fig. 2, a perspective view of a part of my improvement detached; Fig. 3, a front elevation of the form of key represented in Fig. 1; and Fig. 4, a detail view, partly in section, showing the manner in which the keys are adjusted in place.

The principal object of my invention is to permit the collar to be adjustable to the necks of horses of different sizes; but, incidentally, my object is also to afford ample throttle room for the horse, to strengthen the collar at the point which receives the greatest strain in pulling, and to supply a simple and convenient means for attaching the hames.

To the above ends my invention consists, first, in providing each side of the collar with a metallic attachment adapted to be firmly secured to it at its lower end and project below the same, said projecting part of each attachment being provided with a hole and slot to receive and retain a key for the purpose of maintaining the lower ends of the collar at the desired distance apart.

My invention consists, also, in the particular construction of the key which I prefer to employ in combination with the attachment above referred to; also, in combining with the said attachment and key means for securing the latter, when once in position, against accidental displacement; and, furthermore, in providing the said attachments each with a hook to aid in holding the hames in position to the collar, all as hereinafter more fully set forth.

Referring to the drawings, A A are the opposite halves of the collar, which I make detached at the bottom, as shown. If desired, they may be made separable at the top after the manner of ordinary horse-collars; but I prefer to have them permanently joined together at this point, since in this way they are less liable to be productive of discomfort to the animal.

To the lower end of each part A is firmly secured the metallic attachment B, clearly represented in Fig. 2 of the drawings, said attachment comprising the two forked ends, *v v*, adapted to fit over the lower end of the part A, and having rivet-holes *u* to secure them in place, and the extension *t*, having the hole *s* and the slot *r* extending upward for a short distance from the said hole.

C is the key, which may be constructed either as shown in Fig. 3, with a slot, *q*, for the choke-strap, and a notch, *p*, for the pole-strap ring, or plain, as represented in Fig. 4, or in any other suitable design. The essential construction of the key is that it shall have the end bearings, *o*, provided with the flanges *n*, and have the intermediate lateral projection, *m*, to permit it to be turned on its bearings like a crank. To insert the key it is held with the lateral projection *m* upward, when it is readily placed in position, the bearings *o* passing through the holes *s*, and the flanges *n* through the slots *r*. This done, the key is turned over, bringing the lateral projection *m* upon the lower side, when the flanges, bearing against the metal, hold it firmly in place. In order to prevent it from being accidentally displaced I prefer to provide the lower outer end of the extension *t* of one or both of the attachments B with a notch or recess, *l*, to receive and hold the flange *n*.

For the purpose of attaching the hames D, I provide each attachment B with a hook, *k*, projecting from its outside just below the lower end of the collar, and curving downward, as shown, to meet the end of the key when the latter is inserted. This device serves to hold the hames so firmly as to preclude all possibility of their slipping off the collar.

By having two or three keys of different lengths the same collar may be made to vary several inches in diameter, and thus be readily adjusted to horses of different sizes. In addition to this the space *i* above the key and between the extensions *t* affords ample throttle room for the animal and prevents choking, no matter how heavy the load. It will be seen, also, that the forks *v*, passing up both the inside and the outside of the collar, serve to stay and strengthen it at the very point which is most subject to strain.

What I claim as new, and desire to secure by Letters Patent, is—

1. In combination with a horse-collar open at its lower end, the attachments B, each comprising the forked ends $v$, fitting over the said collar and firmly secured thereto, as shown, and the extension $t$ provided with the hole $s$ and slot $r$, to receive the ends of the key C, substantially as described.

2. In combination with a horse-collar open at its lower end and provided with the attachments B, firmly secured thereto, as shown, and each having the extension $t$, provided with the hole $s$ and slot $r$, the key C, comprising the end bearings, $o$, having flanges $n$, and the lateral projection $m$, substantially as described.

3. The combination of the horse-collar A A, attachments B, comprising the forked ends $v$ and extensions $t$, having the holes $s$ and slots $r$, and secured to the said collar, as shown, and the key C, comprising the end bearings, $o$, with flanges $n$, and the lateral projection $m$, one or both of said extensions $t$ being provided with a notch, $l$, in its lower outer end to receive the flange $n$, substantially as described.

4. In combination with the parts A of a horse-collar open at its lower end and provided, as shown, with the attachments B, adapted to receive the key C, the hooks $k$, projecting outward and curving downward from the upper portions of the extensions $t$ of said attachments for the purpose of holding the hames in place upon the collar, substantially as described.

JACOB HERKIMER.

In presence of—
  WM. H. DYRENFORTH,
  P. C. DYRENFORTH.